US012567224B2

(12) United States Patent
Huang et al.

(10) Patent No.: US 12,567,224 B2
(45) Date of Patent: Mar. 3, 2026

(54) METHOD AND DEVICE FOR LOCATING TARGET REGION, AND COMPUTER-READABLE STORAGE MEDIUM

(71) Applicant: CONTEMPORARY AMPEREX TECHNOLOGY (HONG KONG) LIMITED, Hong Kong (CN)

(72) Inventors: Boxiong Huang, Ningde (CN); Guannan Jiang, Ningde (CN); Zhiyu Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 372 days.

(21) Appl. No.: 18/361,972

(22) Filed: Jul. 31, 2023

(65) Prior Publication Data

US 2024/0071030 A1　Feb. 29, 2024

Related U.S. Application Data

(63) Continuation of application No. PCT/CN2023/082669, filed on Mar. 21, 2023.

(30) Foreign Application Priority Data

Aug. 26, 2022　(CN) .......................... 202211032985.7

(51) Int. Cl.
*G06V 10/25*　(2022.01)
*G06T 7/50*　(2017.01)
(Continued)

(52) U.S. Cl.
CPC ............... *G06V 10/25* (2022.01); *G06T 7/50* (2017.01); *G06T 7/73* (2017.01); *G06V 10/44* (2022.01);
(Continued)

(58) Field of Classification Search
CPC ........ G06V 10/25; G06V 10/44; G06V 20/70; G06V 2201/07; G06V 10/462;
(Continued)

(56) References Cited

U.S. PATENT DOCUMENTS

| | | | |
|---|---|---|---|
| 5,259,038 A | 11/1993 | Sakou et al. | |
| 2005/0278098 A1 | 12/2005 | Breed | |
| 2024/0005469 A1* | 1/2024 | Jiang ...................... | G06N 3/045 |

FOREIGN PATENT DOCUMENTS

| | | |
|---|---|---|
| CN | 107424176 A | 12/2017 |
| CN | 108875731 A | 11/2018 |

(Continued)

OTHER PUBLICATIONS

Extended European Search Report of EP application No. 23740921.4, dated Jul. 18, 2024.

(Continued)

*Primary Examiner* — Jerome Grant, II
(74) *Attorney, Agent, or Firm* — Ladas & Parry LLP

(57) ABSTRACT

Some embodiments of this application disclose a method and device for locating a target region on an image, and a computer-readable storage medium. The method includes: obtaining coordinates of target points in a to-be-detected image based on a feature point recognition model; and locating the target region based on the coordinates of the target points. The to-be-detected image includes an unstably imaged target region. A target object in the target region includes a stably imaged first section and an unstably imaged second section. The target points include a feature point on the first section. The method can improve accuracy and efficiency of locating the target region.

15 Claims, 5 Drawing Sheets

(51) Int. Cl.

| | |
|---|---|
| *G06T 7/73* | (2017.01) |
| *G06V 10/44* | (2022.01) |
| *G06V 20/70* | (2022.01) |

(52) U.S. Cl.
CPC .... *G06V 20/70* (2022.01); *G06T 2207/20084* (2013.01); *G06V 2201/07* (2022.01)

(58) Field of Classification Search
CPC ........ G06V 10/776; G06V 10/82; G06T 7/50; G06T 7/73; G06T 2207/20084; G06T 7/0008; G06T 2207/10116; G06T 2207/20081; G06T 7/00
USPC ........................................................ 382/103
See application file for complete search history.

(56) References Cited

FOREIGN PATENT DOCUMENTS

| | | | | |
|---|---|---|---|---|
| CN | 109949227 | A | 6/2019 | |
| CN | 110245566 | A | 9/2019 | |
| CN | 111126258 | A | 5/2020 | |
| CN | 111178235 | A | 5/2020 | |
| CN | 111191714 | * | 5/2020 | ......... G06F 18/2413 |
| CN | 111310775 | A | 6/2020 | |
| CN | 112184711 | A | 1/2021 | |
| CN | 112308046 | A | 2/2021 | |
| CN | 112541395 | A | 3/2021 | |
| CN | 112548273 | * | 3/2021 | ............ B23K 9/127 |
| CN | 112381183 | A | 5/2021 | |
| CN | 112949519 | A | 6/2021 | |
| CN | 113221639 | A | 8/2021 | |
| CN | 113723264 | A | 11/2021 | |
| CN | 113920491 | A | 1/2022 | |
| CN | 114093462 | A | 2/2022 | |
| CN | 114140647 | A | 3/2022 | |
| CN | 114241548 | A | 3/2022 | |
| CN | 114842293 | A | 8/2022 | |
| EP | 4027300 | * | 7/2022 | |
| KR | 20220061360 | A | 5/2022 | |
| WO | 2022052601 | A1 | 3/2022 | |
| WO | 2022053001 | A1 | 3/2022 | |

OTHER PUBLICATIONS

Notice of Grant of Patent for Invention for CN application No. 202211032985.7, dated May 16, 2024.

Wu Tong et al. "Weld Defect Inspection of Battery Pack Based on Deep Learning of Linear Array Image", Laser and Optoelectronics Progress, vol. 57, No. 22, Nov. 2020.

Lifu Li et al. "Capacity Fading Detection of Rectangular LiFePO4 Battery by Tomographic Image", pre-publication of IEEE Instrumentation and Measurement Society, Dec. 31, 2018.

Fist Office Action of CN application No. 202211032985.7, mailed Jun. 7, 2023.

International Search Report for International Application PCT/CN2023/082669, mailed Jun. 21, 2023.

Written Opinion of International Search Authority for International Application PCT/CN2023/082669, mailed Jun. 21, 2023.

Qiu, P.; Zhao, H. P.; Zhu, C. R.; . "Robust local feature point extraction method for partially occluded targets" Modern Electronic Technology, vol. 22, No. 1, Nov. 15, 2013 pp. 76-80.

* cited by examiner

200

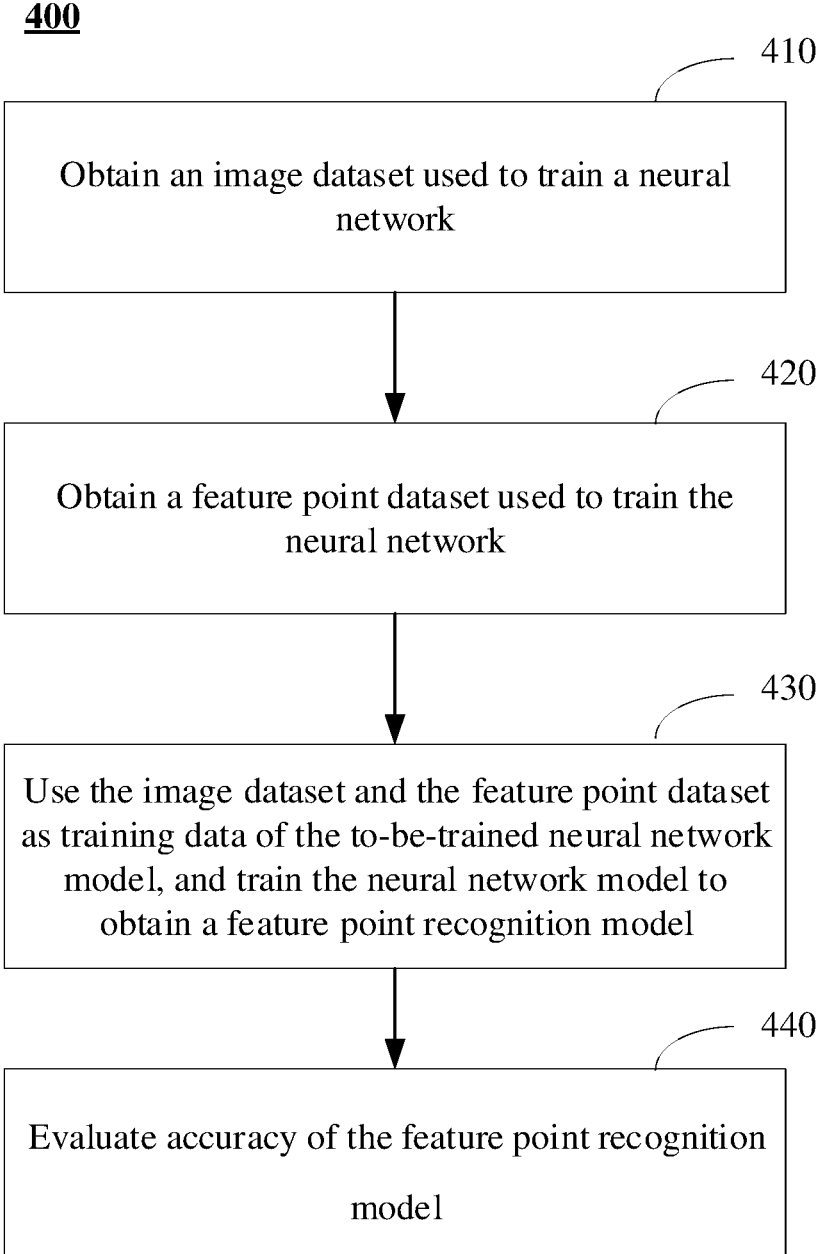

400

410

Obtain an image dataset used to train a neural network

420

Obtain a feature point dataset used to train the neural network

430

Use the image dataset and the feature point dataset as training data of the to-be-trained neural network model, and train the neural network model to obtain a feature point recognition model

440

Evaluate accuracy of the feature point recognition model

FIG. 4

METHOD AND DEVICE FOR LOCATING TARGET REGION, AND COMPUTER-READABLE STORAGE MEDIUM

CROSS-REFERENCE TO RELATED APPLICATIONS

This application is a continuation of International Patent Application No. PCT/CN2023/082669, filed on Mar. 21, 2023, which claims priority to Chinese Patent Application No. 202211032985.7, filed on Aug. 26, 2022. The afore-mentioned patent applications are incorporated herein by reference in their entirety.

TECHNICAL FIELD

This application relates to the technical field of image processing, and in particular, to a method and device for locating a target region, and a computer-readable storage medium.

BACKGROUND

Locating a target region is a process of locating a specific target in an image after the target in the image is recognized through a computer, so that the target is ready for subsequent steps such as recognition and analysis, where the target region means a region occupied by the specific target in the image. However, due to diversity and complexity of the content of the image and varying environmental conditions during image acquisition, noise similar to the target region usually exists in an acquired image, thereby affecting the identification of the target region, and in turn, impairing accuracy and efficiency of locating the target region.

SUMMARY

Some embodiments of this application provide a method and device for locating a target region, and a computer-readable storage medium, to improve accuracy and efficiency of locating the target region.

According to a first aspect, a method for locating a target region is provided, including: obtaining coordinates of target points in a to-be-detected image based on a feature point recognition model; and locating the target region based on the coordinates of the target points. The to-be-detected image includes an unstably imaged target region. A target object in the target region includes a stably imaged first section and an unstably imaged second section. The target points include a feature point on the first section.

In the above technical solution, the to-be-detected image includes a target region to be located. The target region includes a target object. The target object includes a stably imaged first section and an unstably imaged second section. The stably imaged first section means a region of a target object imaged in a plurality of images, where the number of images that can clearly display structural features such as shape and texture of this region accounts for a percentage greater than or equal to a specified value in the total number of such images. The unstably imaged second section means a region of a target object imaged in a plurality of images of the same product or the same type of products, where the number of images that can clearly display structural features such as shape and texture of this region accounts for a percentage less than or equal to a specified value in the total number of such images.

In the technical solution of this application, the target object included in the target region is divided into a stably imaged first section and an unstably imaged second section. Subsequently, the coordinates of the feature point located on the first section are extracted from the to-be-detected image, and the target region is located in the to-be-detected image based on the coordinates of the feature point. In this way, even when the features of the target object are not fully displayed in the image, the target region can still be deter-mined based on the stably imaged section of the target object, thereby improving efficiency and accuracy of locat-ing the target region in an image that fails to fully display the target object due to interference caused by imaging factors, noise, or the like.

In some possible implementations of the first aspect, the target region may be formed directly by using the target points as corner points, or the target region may be obtained by properly adjusting the region formed by the target points. Therefore, the size of the target region can be determined as actually required, so as to be adaptable to subsequent image analysis or processing.

In some possible implementations of the first aspect, before the obtaining coordinates of target points in a to-be-detected image based on a feature point recognition model, the method further includes: training the feature point rec-ognition model based on training data, where the training data includes labeled feature points, and the labeled feature points include the feature point on the first section.

In the above implementations, an appropriate feature point recognition model can be obtained.

In some possible implementations of the first aspect, the training the feature point recognition model based on train-ing data includes: obtaining the training data, where the training data includes a training image set and a feature point dataset; inputting the training dataset into to-be-trained neural network model to perform feature extraction and obtain an estimate of coordinates of the feature point; determining a function value of a first loss function based on the estimate of the coordinates of the feature point and a ground truth corresponding to the estimate of the coordi-nates of the feature point in the training dataset, where the function value of the first loss function is used to indicate a deviation between the estimate of the coordinates of the feature point and the ground truth; updating a parameter of the to-be-trained neural network model based on the func-tion value of the first loss function; and determining that the function value of the first loss function has converged to a first threshold, and then using a current neural network model as the feature point recognition model.

In the above implementations, a highly robust feature point recognition model can be obtained.

In some possible implementations of the first aspect, the obtaining the training data includes: generating a training image based on a depth map that includes the target region; and labeling feature points for the training image to obtain the training image set.

In the above implementations, an object in the image can recognized accurately by using the depth information included in the depth map, thereby improving the accuracy and efficiency of the labeling process.

In some possible implementations of the first aspect, the obtaining the training data includes: sorting feature points on a training image to obtain the feature point dataset.

In the above implementations, a basic relationship between the feature points can be obtained. The sorted feature points are used as data for training the neural network model, thereby enhancing the performance of the model based on the structural characteristics of the actual target object.

In some possible implementations of the first aspect, the feature point dataset includes the coordinates and a serial number of the feature point. The feature point dataset may further include a descriptor of the feature point and a relative positional relationship between feature points.

In the above implementations, the training data of the neural network model can include more sufficient information, and correct feature points can be extracted from an object of a similar shape or structure in the image, thereby ensuring accuracy of the output from the model.

In some possible implementations of the first aspect, before the inputting the to-be-detected image into the feature point recognition model, the method further includes: obtaining an original image; and converting the original image into an image in a PNG format to obtain the to-be-detected image.

In the above implementations, the data storage requirement can be lowered effectively without losing any data features required for locating the target region.

In some possible implementations of the first aspect, the feature point dataset is stored in a JSON format.

In the above implementations, the feature point information can be stored in a data format that is highly readable, highly versatile, and compatible with a plurality of programming languages, and the information of this dataset can be fully utilized.

In some possible implementations of the first aspect, after the determining that the function value of the first loss function has converged to a first threshold, the method further includes: inputting the training image set as a test set into the feature point recognition model to obtain an estimate of the feature point; and calculating an accuracy metric based on the estimate of the feature point and the ground truth of the coordinates of the feature point corresponding to the training image set.

In the above implementations, it can be learned whether the accuracy of the trained feature point recognition model meets the actual requirement. When the accuracy does not meet the actual requirement, the parameters of the feature point recognition model can be adjusted in time.

In some possible implementations of the first aspect, the accuracy metric is a Euclidean square root mean value of the estimate of the feature point and the ground truth of the coordinates of the feature point corresponding to the training image set.

In the above implementations, the accuracy of the model can be evaluated effectively.

In some possible implementations of the first aspect, the to-be-trained neural network model includes a backbone feature extraction neural network. The backbone feature extraction neural network is a ResNet18 neural network.

In the above implementations, the requirement on the device hardware is lowered in a training and recognition process on the basis of meeting the feature point recognition requirements.

In some possible implementations of the first aspect, the first loss function is a Smooth L1 loss function.

In the above implementations, the training process of the feature point recognition model can converge easily and be highly stable.

In some possible implementations of the first aspect, the to-be-detected image is an image of an adapter strip and an electrode post that are welded in a battery cell. The target region includes a weld region of the electrode post and the adapter strip.

In the above implementations, the obtained target region can be used for subsequent detection of defects of the adapter strip, thereby improving the yield rate of the ex-factory batteries and ensuring superior functionality and safety of the batteries.

In some possible implementations of the first aspect, the target object is the adapter strip. The adapter strip includes a tab connecting portion and an electrode post connecting portion. One end of the tab connecting portion is connected to the electrode post connecting portion. The first section is the tab connecting portion. The target points include coordinate points located at two ends of the tab connecting portion.

In the above implementations, when the target region is a region that includes an electrode post and an adapter strip inside the battery cell, the target region can be obtained accurately and stably.

According to a second aspect, a device for locating a target region is provided, including: a feature point extraction module, configured to: obtain coordinates of target points in a to-be-detected image based on a feature point recognition model; and a target region locating module, configured to locate the target region based on the coordinates of the target points. The to-be-detected image includes an unstably imaged target region. A target object in the target region includes a stably imaged first section and an unstably imaged second section.

The target points include a feature point on the first section.

In some possible implementations of the second aspect, the device further includes: a training module, configured to: train the feature point recognition model based on training data before the coordinates of target points in a to-be-detected image are obtained based on a feature point recognition model, where the training data includes labeled feature points, and the labeled feature points include the feature point on the first section.

In some possible implementations of the second aspect, the device further includes: an obtaining module, configured to obtain training data; and a storage module, configured to store the training data. The training data includes a training image set and a feature point dataset. The training module is configured to: input the training dataset into to-be-trained neural network model to perform feature extraction and obtain an estimate of coordinates of the feature point; determine a function value of a first loss function based on the estimate of the coordinates of the feature point and a ground truth corresponding to the estimate of the coordinates of the feature point in the training dataset, where the function value of the first loss function is used to indicate a deviation between the estimate of the coordinates of the feature point and the ground truth; update a parameter of the to-be-trained neural network model based on the function value of the first loss function; and determine that the function value of the first loss function has converged to a first threshold, and then use a current neural network model as the feature point recognition model.

In some possible implementations of the second aspect, the obtaining module is configured to: generate a training image based on a depth map that includes the target region; and label feature points for the training image to obtain the training image set.

In some possible implementations of the second aspect, the obtaining module is configured to: sort feature points on a training image to obtain the feature point dataset. In some possible implementations of the second aspect, the storage module is configured to store the coordinates and a serial number of the feature point.

In some possible implementations of the second aspect, the storage module is configured to store a descriptor of the feature point and a relative positional relationship between feature points.

In some possible implementations of the second aspect, the device further includes an image preprocessing module, configured to: obtain an original image; and convert the original image into an image in a PNG format to obtain the to-be-detected image.

In some possible implementations of the second aspect, the storage module is configured to store the feature point dataset in a JSON format.

In some possible implementations of the second aspect, the device further includes an accuracy evaluation module, configured to: input the training image set as a test set into the feature point recognition model after it is determined that the function value of the first loss function has converged to a first threshold, so as to obtain an estimate of the feature point; and calculate an accuracy metric based on the estimate of the feature point and the ground truth of the coordinates of the feature point corresponding to the training image set.

In some possible implementations of the second aspect, the accuracy evaluation module is configured to: calculate a Euclidean square root mean value of the estimate of the feature point and the ground truth of the coordinates of the feature point corresponding to the training image set.

In some possible implementations of the second aspect, the to-be-trained neural network model includes a backbone feature extraction neural network. The backbone feature extraction neural network is a ResNet18 neural network.

In some possible implementations of the second aspect, the first loss function is a Smooth L1 loss function.

In some possible implementations of the second aspect, the to-be-detected image is an image of an adapter strip and an electrode post that are welded in a battery cell. The target region includes a weld region of the electrode post and the adapter strip. The feature point extraction module is configured to: extract feature points from an image of an adapter strip and an electrode post that are welded in a battery cell. The target region locating module is configured to: locate, based on the feature points, the target region in the image of the adapter strip and the electrode post that are welded in the battery cell.

In some possible implementations of the second aspect, the target object is the adapter strip. The adapter strip includes a tab connecting portion and an electrode post connecting portion. One end of the tab connecting portion is connected to the electrode post connecting portion. The first section is the tab connecting portion. The target points include coordinate points located at two ends of the tab connecting portion.

According to a third aspect, a device for locating a target region is provided. The device includes a processor and a memory. The memory is configured to store a program. The processor is configured to call the program from the memory and run the program to perform the method for locating a target region according to the first aspect or any one possible implementation of the first aspect.

According to a fourth aspect, a computer-readable storage medium is provided and configured to store a computer program. When executed on a computer, the computer program causes the computer to perform the method for locating a target region according to the first aspect or any one possible implementation of the first aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

FIG. 4 is a schematic flowchart of a process of training a feature point recognition model according to an embodiment of this application;

DETAILED DESCRIPTION

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments. Understandably, specific examples given herein are merely intended to help a person skilled in the art understand embodiments of this application more clearly, but not to limit the scope of embodiments of this application.

Understandably, in various embodiments of this application, the sequence number of a step does not mean the implementation order of the step. The implementation order of each step depends on its functionality and intrinsic logic, but does not constitute any limitation on the implementation process of an embodiment of this application. Various embodiments described in this specification may be implemented alone or in combination, without being limited herein.

Unless otherwise defined, all technical and scientific terms used herein bear the same meanings as what is normally understood by a person skilled in the technical field of this application. The terms used herein are merely intended to describe specific embodiments but not to limit the scope of this application. The term "and/or" used herein includes any and all combinations of one or more relevant items recited.

In an image acquisition process, the position of an object relative to an acquisition environment and an acquisition device is hardly identical between a plurality of to-be-detected images acquired. Therefore, the position and shape of the target object may differ between the acquired images, thereby impairing accuracy of locating a target region. Although the position and shape of the target object differ between the to-be-detected images, some structures are stably imaged relatively in such images. That is, the shape features of such structures rendered in the images are discernible. Therefore, the relatively stable structures are useful for accurately locating the target region. Some embodiments of this application are applicable to locating a target region in a to-be-detected image by using the structures that are stably imaged relatively. The format and type of the to-be-detected image are not limited in an embodiment of this application. Some embodiments of this application are applicable to, but not limited to, locating a target region in an image acquired by an X-ray imaging device, and are applicable to locating a target region in other types of images. The image acquisition method and the acquisition device are not limited in an embodiment of this application.

Figure 1:
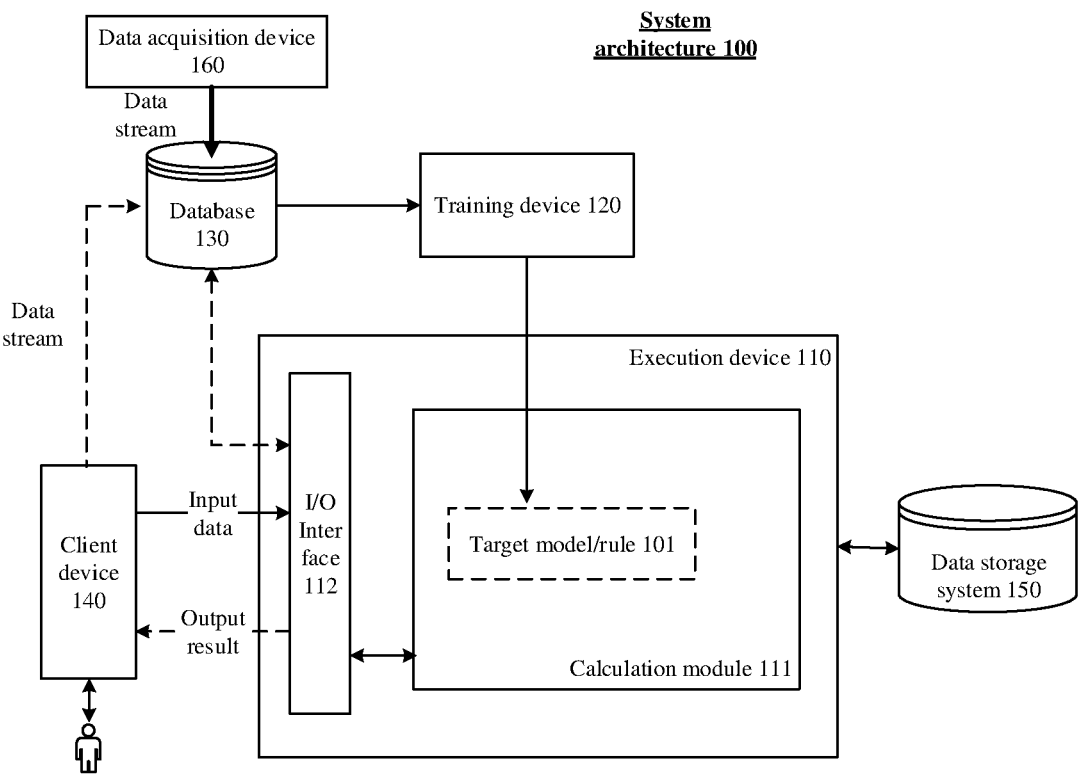
FIG. 1 is a schematic diagram of a system architecture according to this application.

For a better understanding of the technical solutions of this application, the following briefly describes possible application scenarios of an embodiment of this application with reference to FIG. 1 first.

As shown in FIG. 1, an embodiment of this application provides a system architecture 100. In FIG. 1, a data acquisition device 160 is configured to acquire a specimen image. With respect to the method for locating a target region according to an embodiment of this application, the specimen image may be a specimen image that includes a to-be-located target region.

After acquiring the specimen image, the data acquisition device 160 stores the specimen image into a database 130. A training device 120 performs training based on the specimen images maintained in the database 130, so as to obtain a target model/rule 101.

The target model/rule 101 is used to implement the method for locating a target region according to an embodiment of this application. The target model/rule 101 according to an embodiment of this application may specifically be a neural network. It is hereby noted that in practical applications, the specimen images maintained in the database 130 are not necessarily all acquired by the data acquisition device 160, but may be received from another device. In addition, it is hereby noted that the training device 120 does not necessarily train the target model/rule 101 totally based on the specimen images maintained in the database 130, but may train the model based on a specimen image obtained from the cloud or elsewhere. The foregoing description is not a limitation on any embodiment of this application.

The target model/rule 101 trained by the training device 120 may be applied to different systems or devices, for example, applied to an execution device 110 shown in FIG. 1. The execution device 110 may be a terminal, such as a mobile phone terminal, a tablet computer, a notebook computer, or the like, and may be a server, a cloud, or the like. In FIG. 1, the execution device 110 is equipped with an input/output (input/output, I/O) interface 112 configured to perform data exchange with an external device. A user may input data to the I/O interface 112 through a client device 140. In this embodiment of this application, the input data may include the to-be-detected image input by the client device 140.

In some implementations, the client device 140 may be the same device as the execution device 110. For example, the client device 140 and the execution device 110 may both be terminal devices.

In some other implementations, the client device 140 may be a device different from the execution device 110. For example, the client device 140 is a terminal device, but the execution device 110 is a cloud, a server, or another device. The client device 140 may interact with the execution device 310 over a communications network based on any communications mechanism or communications standard. The communications network may be a wide area network, a local area network, a point-to-point connection, or the like, or any combination thereof.

A calculation module 111 of the execution device 110 is configured to perform operations based on the input data (such as the to-be-detected image) received by the I/O interface 112. When the calculation module 111 of the execution device 110 performs relevant operations such as calculation, the execution device 110 may call data, code, and the like in a data storage system 150 to perform corresponding operations, and may store the data, instructions, and the like obtained in the corresponding operations into the data storage system 150.

Finally, the I/O interface 112 returns a processing result, such as a target region locating result obtained above, to the client device 140, so as to provide the processing result to the user.

It is hereby noted that the training device 120 may generate a corresponding target model/rule 101 for each different target (or referred to as different task) based on different training data. The corresponding target model/rule 101 may be used for achieving the foregoing target or completing the foregoing task, thereby providing the desired result to the user.

In the situation shown in FIG. 1, the user may manually specify the input data, for example, by performing an operation on an interface provided by the I/O interface 112. In another circumstance, the client device 140 may automatically send the input data to the I/O interface 112. If the automatic sending of the input data by the client device 140 is subject to the user's permission, the user may set a corresponding permission in the client device 140. The user can view, on the client device 140, a result output by the execution device 110, and the result is rendered by means of display, sound, action, or the like. The client device 140 may serve as a data acquisition end, and acquires the input data of the input I/O interface 112 and the output result of the output I/O interface 112 as new specimen data, and stores the data in the database 130. Alternatively, instead of acquiring the data by the client device 140, the I/O interface 112 may directly use the input data of the input I/O interface 112 and the output result of the output I/O interface 112 shown in the drawing as new specimen data, and store the specimen data into the database 130.

It is hereby noted that FIG. 1 is merely a schematic diagram of a system architecture according to an embodiment of this application. The positional relationship between the devices, components, modules, and the like shown in the drawing does not constitute any limitation. For example, in FIG. 1, the data storage system 150 is an external memory to the execution device 110. In other circumstances, the data storage system 150 may be installed in the execution device 110.

As shown in FIG. 1, a target model/rule 101 is trained by the training device 120. The target model/rule 101 may be a neural network in this embodiment of this application.

Specifically, the neural network in this embodiment of this application may be a convolutional neural network (CNN), a region convolutional neural network (RCNN), or another type of neural network, or the like, without being specifically limited in this application.

The production process of a power lithium battery includes many steps. Limited by technical process, equipment, or processing environment, the battery is prone to be defective. Therefore, in each step of production, defects of the battery are detected in various ways to improve the yield rate and ensure high quality and safety of the battery. A defect detection performed on a joint between an electrode post and an adapter strip of a lithium battery is referred to as adapter strip detection. The adapter strip is a key component that connects a battery cover plate and a battery cell, and needs to meet the requirements on overcurrent prevention, high strength, and a low degree of splatter for the battery at the same time. The adapter strip is usually connected to the electrode post of the lithium battery by welding. The strength at the joint directly affects the functionality and safety of the battery. However, affected by the properties, dimensions, and manufacturing process of the material, the joint between the adapter strip and the end cap electrode post is prone to deform and fracture. Therefore, a vital step to be performed before shipment of the battery from the factory is to detect defects at the joint between the adapter strip and the electrode post. Through such detection, the battery that is defective at the joint between the adapter strip and the electrode post can be screened out, thereby ensuring superior functionality and safety of the ex-factory batteries. However, the adapter strip is sealed inside the battery by the end cap of the battery, and a conventional industrial visual inspection method is unable to detect the defects. Therefore, the detection is usually performed by X-ray imaging. However, the type and the compactness of the material of the target region to be detected are close to those of other materials inside the battery cell. An image acquired by X-ray imaging contains a large amount of noise similar to the target region. In addition, the target region to be detected is sealed inside the battery by the end cap and the shell of the battery, and can hardly be controlled to exist at the same position in all images during imaging, thereby impairing accuracy and efficiency of locating the target region, and bringing difficulties to the defect detection inside the battery.

In view of the facts above, an embodiment of this application provides a method for locating a target region. According to the method disclosed herein, the target object included in the target region is divided into a stably imaged first section and an unstably imaged second section. Subsequently, the coordinates of the feature point located on the first section are extracted from the to-be-detected image, and the target region is located in the to-be-detected image based on the coordinates of the feature point. In this way, even when the features of the target object are not fully displayed in the image, the target region can still be determined based on the stably imaged section of the target object, thereby improving efficiency and accuracy of locating the target region in an image that fails to fully display the target object due to interference caused by imaging factors, noise, or the like.

The method and device for locating a target region according to this embodiment of this application are applicable to, but not limited to, images acquired by an X-ray imaging device, and are applicable to extracting a target region from other images characterized by dense noise. This embodiment of this application is applicable to scenarios including but not limited to defect detection inside the battery, and is also applicable to defect detection of other various products in modern industrial manufacturing.

Figure 2:
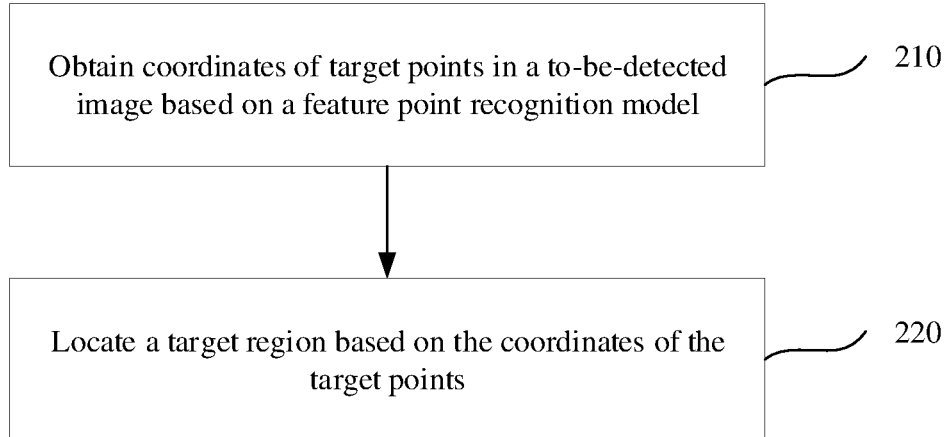
FIG. 2 is a schematic flowchart of a method for locating a target region according to an embodiment of this application.

FIG. 2 is a schematic flowchart of a method 200 for locating a target region according to an embodiment of this application. The method 200 for locating a target region includes the following steps:

210. Obtain coordinates of target points in a to-be-detected image based on a feature point recognition model. The to-be-detected image includes a target region to be located. The target region includes a target object. The target object includes a stably imaged first section and an unstably imaged second section. The stably imaged first section means a region of a target object imaged in a plurality of images, where the number of images that can clearly display structural features such as shape and texture of this region accounts for a percentage greater than or equal to a specified value in the total number of such images. The unstably imaged second section means a region of a target object imaged in a plurality of images of the same product or the same type of products, where the number of images that can clearly display structural features such as shape and texture of this region accounts for a percentage less than or equal to a specified value in the total number of such images.

The target points include a feature point on the first section. A target point means a point used to locate the target object, and in turn, obtain the target region. A feature point means a point that possesses characteristic properties and that can reflect essential characteristics of the target object, and in turn, can identify the target object.

220. Locate the target region based on the coordinates of the target points. The target region means a region containing the target object. In most cases during processing and analysis of an image, not all information in the entire image is required, but the information of a region of interest is desired. By extracting the target region, the region of interest can be separated, thereby improving efficiency of subsequent processing.

Optionally, in step 220, the target region may be directly determined based on the target points. For example, the target points are used as corner points of the target region, and a polygon formed by the target points is used as the target region. Alternatively, the target region is indirectly determined based on the target points. To be specific, geometric parameters such as the position, corner points, and side length of the target region are determined based on the target points. For example, the sides of the polygon formed by the target points are translated to obtain target regions of different areas.

In the method according to this embodiment of this application, the target object included in the target region is divided into a stably imaged first section and an unstably imaged second section. Subsequently, the coordinates of the feature point located on the first section are extracted from the to-be-detected image, and the target region is located in the to-be-detected image based on the coordinates of the feature point. In this way, even when the features of the target object are not fully displayed in the image, the target region can still be determined based on the stably imaged section of the target object, thereby improving efficiency and accuracy of locating the target region in an image that fails to fully display the target object due to interference caused by imaging factors, noise, or the like.

Optionally, in step 210, the to-be-detected image may be an image shot by a charge coupled device (CCD) camera, or an image acquired by an X-ray imaging device, or an image shot by another camera, without being limited herein.

Optionally, in step 210, the feature point recognition model is a pre-trained neural network model.

Optionally, before the obtaining coordinates of target points in a to-be-detected image based on a feature point recognition model, the method further includes: training the feature point recognition model based on training data, where the training data includes labeled feature points, and the labeled feature points include the feature point on the first section.

Figure 3:
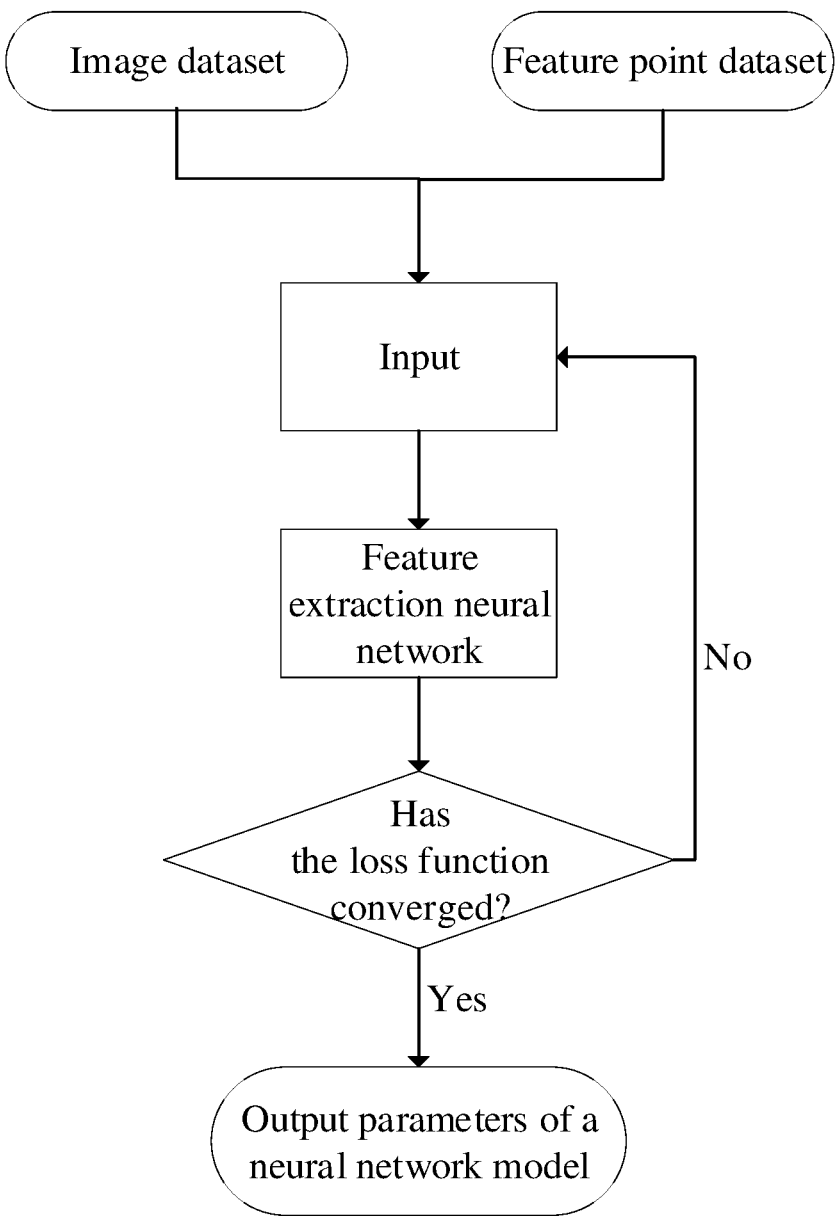
FIG. 3 is a schematic flowchart of a process of adjusting parameters of a feature point recognition model according to an embodiment of this application.

FIG. 3 is a schematic flowchart of a process of adjusting parameters of a feature point recognition model according to an embodiment of this application. The training process includes the following steps:

Step 1: Obtain a training dataset. Optionally, the training dataset includes an image dataset and a feature point dataset. The training dataset means a set of data used to train the neural network model. The image dataset includes a positive specimen image set and a negative specimen image set that are generated from a depth map that includes the target region. The positive specimen image set means a set of images that each include the target object. The negative specimen image set means a set of images that do not include the target object. The depth map, also known as a distance image, is an image that records distances from a shooting device to different points in a scene and that can reflect the geometric shape of the object in the scene. The information included in the depth map is more abundant, thereby improving the efficiency of feature point labeling. The feature point dataset is a set of coordinates and serial numbers of feature points, where the coordinates and serial numbers are obtained by labeling the feature points based on the image dataset.

Optionally, the image dataset may be an image set formed by converting the image acquired by the image acquisition device into an image in a 4-channel 8-bit PNG format. Using the image set in this format as a training set of the neural network can lower the data storage requirement effectively without losing any desired data features. In some embodiments of this application, the data storage requirement can be lowered by 92%.

Optionally, the feature point dataset is a dataset obtained by labeling the feature points for the image dataset. The feature point dataset may include the coordinates and serial number of each feature point. The feature point dataset may further include the name and descriptor of each feature point as well as the relative positional relationship between feature points.

Optionally, the feature point dataset may be stored in a JSON format. The data stored in the JSON format is of a simple and clear hierarchy and high readability and can be parsed by a plurality of languages, thereby being highly versatile.

Step 2: Input the training dataset into to-be-trained neural network model to perform feature extraction and obtain an estimate of coordinates of the feature point.

Optionally, the to-be-trained neural network includes a backbone feature extraction neural network and an output layer. The object to be learned by the to-be-trained neural network is a relationship between the feature point and the image. Optionally, the backbone feature extraction neural network is a ResNet18 neural network, or another neural network such as RestNet50 and HRnet. However, in this embodiment of this application, the ResNet18 neural network is the smallest model to the extent that the requirements are met. This neural network used as a backbone feature extraction neural network can lower the requirements imposed by a calculation process on hardware such as a graphics processing unit (GPU), and control the calculation cost.

Step 3: Determine a function value of a first loss function based on the estimate of the coordinates of the feature point and a ground truth corresponding to the estimate of the coordinates of the feature point in the training dataset. The function value of the first loss function is used to indicate a deviation between the estimate of the coordinates of the feature point and the ground truth. Optionally, the first loss function may be a SmoothL1 loss function, or an L1 loss function or an L2 loss function. In this embodiment of this application, the SmoothL1 loss function is easier to converge than other loss functions, and can ensure stability of the training process.

Step 4: Update parameters of the to-be-trained neural network model based on the function value of the first loss function, and train the neural network iteratively; and determine that the function value of the first loss function has converged to a first preset threshold, and then use the current neural network model as the feature point recognition model.

Optionally, in some embodiments of this application, the method for locating a target region further includes: calculating a first accuracy metric based on an output value of the feature point recognition model and a corresponding ground truth (gt), and specifically, reasoning the model after completion of the training, and measuring the accuracy of the model based on the error between the output value of the neural network and the corresponding ground truth, so that the parameters of the model can be adjusted in time based on the required accuracy. Optionally, the accuracy metric is a Euclidean square root mean value of the output value and the corresponding ground truth.

The method for locating a target region according to this application is described in more detail below with reference to an embodiment. For ease of description, in this embodiment, an internal image of a battery cell acquired by an X-ray imaging device is used as a to-be-detected image for locating the target region. An electrode post and an adapter strip of the battery cell are connected by welding, and are sealed inside the battery by an end cap and a shell of the battery. In this embodiment, the target region is a region at the joint between the adapter strip and the electrode post.

The X-ray is highly penetrative, and can pass through substances impenetrable to general visible light, and therefore, is typically used in component flaw detection. The X-ray can check defects inside a metal material, a non-metal material, or a product made thereof, for example, detect volumetric defects such as welding slag in a weld, and incomplete penetration.

In an image acquired by an X-ray, a less dense part is lighter in color, and the defects in an object can be recognized through a contrast between brightness and dimness. However, for a jelly-roll type lithium battery in this embodiment, the joint between an adapter strip and a tab is sealed inside the battery by the shell and end cap of the battery after the battery is manufactured. The adapter strip, the end cap of the lithium battery, and tab are made of similar materials, are of similar compactness, and are connected to each other, and therefore, it is difficult to distinguish between them in an image shot by an X-ray imaging device.

Figure 5:
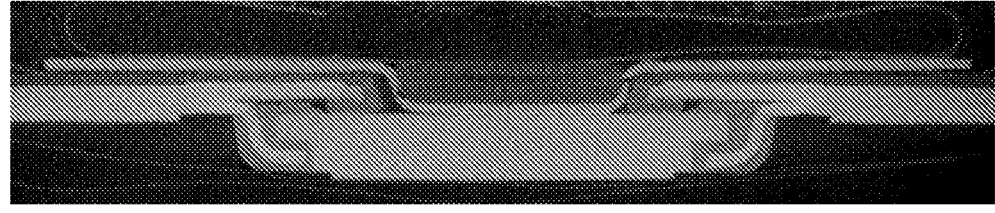
FIG. 5 is an original image according to an embodiment of this application.

FIG. 5 is an original image according to an embodiment of this application. As shown in FIG. 5, the adapter strip of the battery cell is of a symmetric structure. As shown in the image, the cross-section of the adapter strip is U-shaped. The adapter strip includes two tab connecting portions and one electrode post connecting portion. The two tab connecting portions are located on two sides of the electrode post connecting portion respectively, and are at an angle to the electrode post connecting portion. One end of a tab connecting portion is configured to be connected to a tab of the battery, and the other end of the tab connecting portion is connected to the electrode post connecting portion. The electrode post connecting portion is welded to an electrode post of the battery. In this embodiment, the tab connecting portion is of a clear, symmetric, and splayed structure in the image. Therefore, the tab connecting portion is used as a first section. However, the electrode post connecting portion is welded to the electrode post, and therefore, is not clearly seen in the image. In this embodiment, the electrode post connecting portion is a second section. FIG. 4 is a schematic flowchart of a process of training a feature point recognition model according to this embodiment. As shown in FIG. 4, the process of training a feature point recognition model includes the following steps:

S410. Obtain an image dataset used for training a neural network: image the electrode post of the battery cell by using an X-ray imaging device, obtain a depth map in a 6-channel 8-bit tiff format, and then convert the depth map into a depth map in a 4-channel 8-bit PNG format.

The depth map not only includes geometric shapes of visible surfaces of an object, but also reflects a distance from the object to the camera plane. Therefore, the depth map is more conducive to determining the target object and feature points during labeling.

Figure 6:
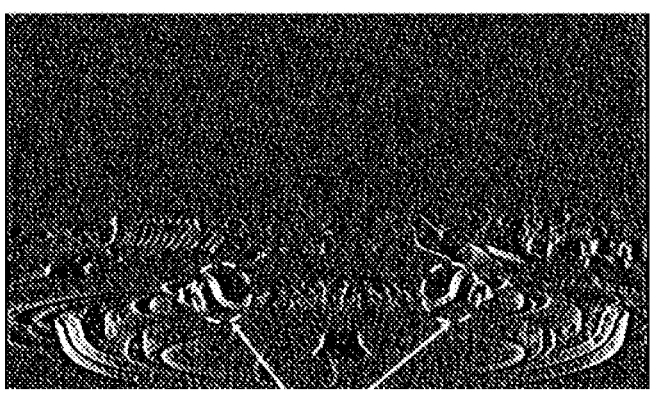
FIG. 6 is a schematic diagram of a feature region according to an embodiment of this application.

S420. Obtain a feature point dataset used for training the neural network: analyze the obtained depth map in the PNG format, determine feature points, and label the feature points. FIG. 6 is a schematic diagram of a target region according to this embodiment. As shown in FIG. 6, the target region in this embodiment is a region that includes a weld joint of the adapter strip and the tab, that is, the region in the dashed box in FIG. 6.

Figure 7:
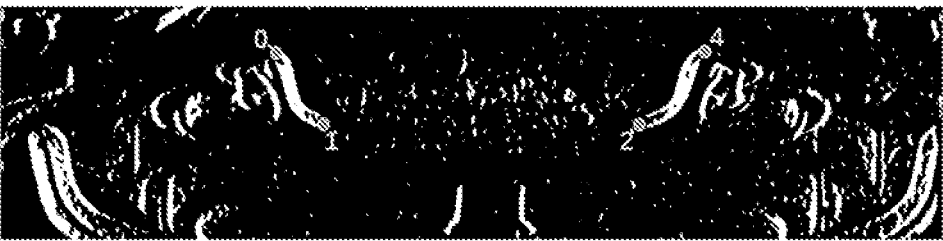
FIG. 7 is a schematic diagram of feature point labeling according to an embodiment of this application.

FIG. 7 is a schematic diagram of feature point labeling according to an embodiment of this application. As shown in FIG. 7, in step S420, a point 0 at an end portion on a left side of the adapter strip is selected as a first feature point, a point 1 at a bend portion on the left side of the adapter strip is selected as a second feature point, a point 2 at a bend portion on the right side of the adapter strip is a third feature point, and a point 4 at an end portion on the right side of the adapter strip is a fourth feature point. The data of such feature points constitute a feature point dataset. The feature point dataset includes the coordinates and serial number of each feature point.

In this embodiment, the feature points are serialized into the data in a JSON data exchange format. The JSON data exchange format is advantageous by virtue of simple grammatical format, clear hierarchy, high readability, and high transmission efficiency, and can increase a ratio of payload data packets to the total number of all packets, thereby further lowering the storage requirement and facilitating subsequent data processing.

Step S430: Use the image dataset and the feature point dataset as input of the to-be-trained neural network model, and train the neural network model to obtain a feature point recognition model. In this embodiment, the to-be-trained neural network model includes a feature extraction layer and an output layer. The to-be-trained neural network model outputs the coordinates of each feature point on the PNG image. In this embodiment, the Smooth L1 loss function is used as a loss function for training the neural network model. When the loss function has converged or has been iterated for a preset number of times, the parameters of a feature point recognition model are output by using the current neural network as the feature point recognition model.

Optionally, in order to adjust the prediction accuracy of the neural network to fall within a desired range, after step S430, the method may further include the following step:

Step S440: Evaluate the accuracy of the feature point recognition model: input the labeled PNG image set as a test set into the feature point recognition model, and calculate an error between the feature point coordinates output by the neural network and the labeled feature point coordinates. When the error is greater than or equal to a preset threshold, it indicates that the prediction accuracy of the neural network does not meet the prediction requirement. In this case, the neural network may be retrained, or the parameters of the neural network may be adjusted, depending on the actual needs.

Optionally, Root Mean Square Error (RMSE), Mean Square Error (MSE), Mean Absolute Error (MAE), Standard Deviation (SD), and the like may be used as prediction accuracy metrics of the neural network. In this embodiment, RMSE is used as a prediction accuracy metric so that the accuracy can be evaluated more effectively.

The foregoing has described in detail the method embodiment according to an embodiment of this application. The following describes a device embodiment according to an embodiment of this application. The device embodiment corresponds to the method embodiment, and therefore, for the content not described in detail in the device embodiment, reference may be made to the preceding method embodiment. The device can implement any possible implementation in the foregoing method.

Figure 8:
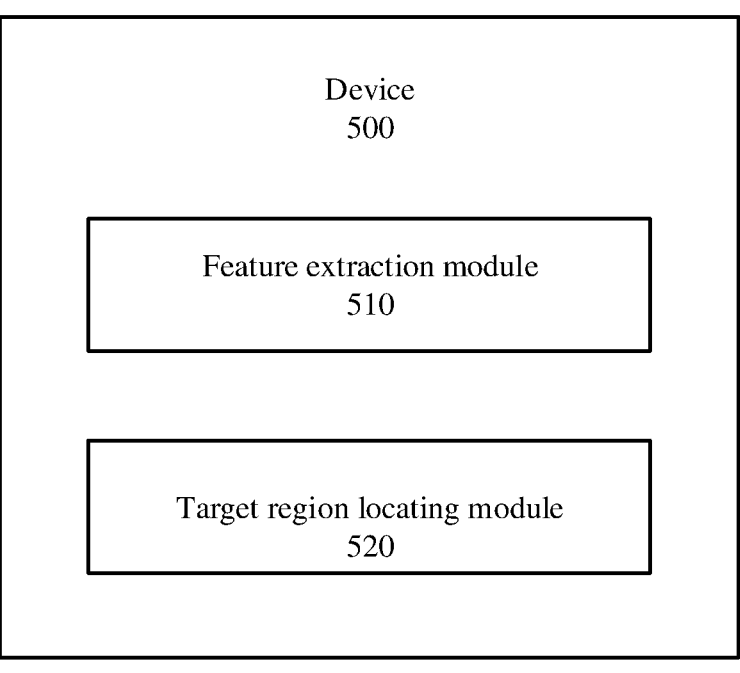
FIG. 8 is a schematic structural block diagram of a device for locating a target region according to an embodiment of this application.

FIG. 8 is a schematic block diagram of a device 500 for locating a target region according to an embodiment of this application. The device 500 can execute the foregoing method for locating a target region according to an embodiment of this application. For example, the device 500 may be the execution device 110 described above.

As shown in FIG. 8, the device includes: a feature extraction module 510, configured to extract feature points coordinates corresponding to a to-be-detected image based on a feature point recognition model; and a target region locating module 520, configured to locate the target region in the to-be-detected image based on geometric elements.

In the above implementation, the feature point coordinates are extracted from the to-be-detected image, the geometric elements that constitute the target region are determined based on the feature point coordinates, and then the target region is located in the to-be-detected image. The target region can be obtained based on the feature point coordinates predicted by the neural network, thereby improving the efficiency and accuracy of locating the target region in an image that includes relatively much noise.

Optionally, in some embodiments, the feature point recognition model is a pre-trained neural network model, and the device includes: an obtaining module, configured to obtain a training dataset; a storage module, configured to store model parameters and the training dataset; a processing module, configured to: input the training dataset into to-be-trained neural network model to perform feature extraction and obtain an estimate of coordinates of the feature point; determine a function value of a first loss function based on the estimate of the coordinates of the feature point and a ground truth corresponding to the estimate of the coordinates of the feature point in the training dataset, where the function value of the first loss function is used to indicate a deviation between the estimate of the coordinates of the feature point and the ground truth; update a parameter of the to-be-trained neural network model based on the function value of the first loss function; and determine that the function value of the first loss function has converged to a first threshold, and then use a current neural network model as the feature point recognition model.

Optionally, in some embodiments, the training dataset includes a training image set and a feature point dataset. Optionally, in some embodiments, the device further includes: a specimen image generation module, configured to generate a training image set based on a depth map that includes the target region, where the training image set includes a positive specimen image set and a negative specimen image set. Optionally, in some embodiments, the device further includes: a feature point labeling module, configured to label feature points for the training image set to generate a feature point dataset. Optionally, in some embodiments, the feature point labeling module is configured to: label coordinates and a serial number of each feature point in the training image set. Optionally, in some embodiments, the feature point labeling module is configured to: label a descriptor of each feature point and a relative positional relationship between the feature points in the training image set. Optionally, in some embodiments, the to-be-trained neural network model includes a backbone feature extraction neural network. The backbone feature extraction neural network is a ResNet18 neural network. Optionally, in some embodiments, the first loss function is a Smooth L1 loss function. Optionally, in some embodiments, the device further includes: a preprocessing module, configured to: obtain an original image; and convert the original image into an image in a 4-channel 8-bit PNG format to obtain the to-be-detected image. Optionally, in some embodiments, the storage module is configured to store the feature point dataset in a JSON format. Optionally, in some embodiments, the device further includes an accuracy evaluation module, configured to calculate a first accuracy metric based on an output value of the feature point recognition model and a corresponding ground truth. Optionally, in some embodiments, the accuracy evaluation module is configured to calculate a first accuracy metric that is a Euclidean square root mean value of the output value and the corresponding ground truth. Optionally, in some embodiments, the geometric element obtaining module is configured to obtain one or more of the shape, corner point coordinates, side length, circle center coordinates, or radius of the target region based on the feature point coordinates.

In some embodiments, the original image is an image of an adapter strip and an electrode post that are welded in a battery cell. The target region includes a weld region of the electrode post and the adapter strip. The target object is the adapter strip. The adapter strip includes a tab connecting portion and an electrode post connecting portion. One end of the tab connecting portion is connected to the electrode post connecting portion. The first section is the tab connecting portion. The target points include coordinate points located at two ends of the tab connecting portion.

Figure 9:
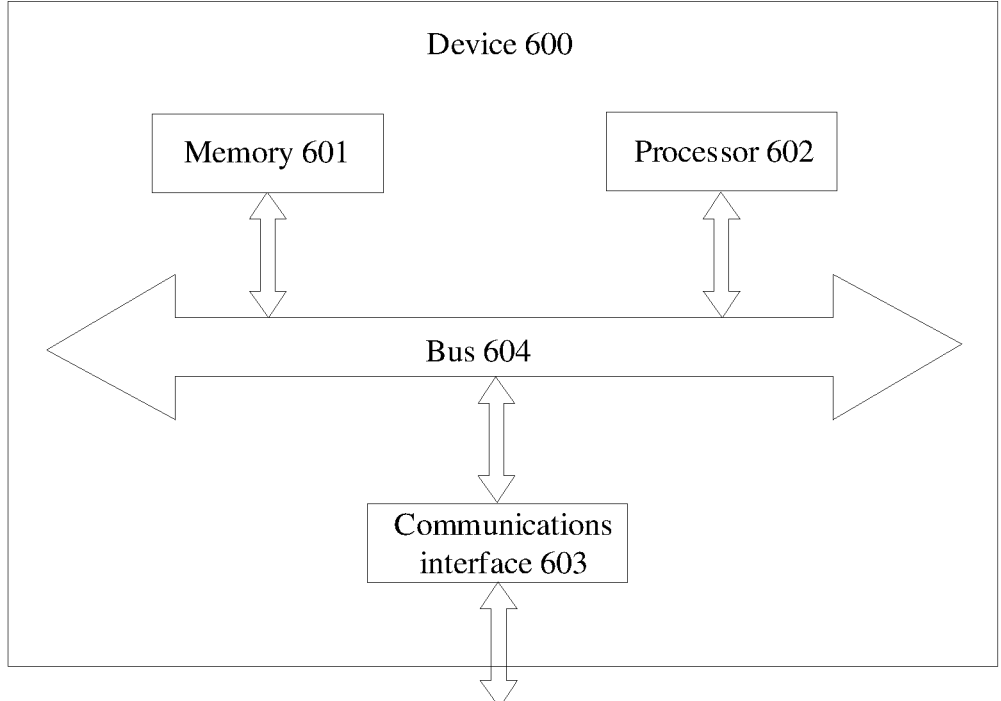
FIG. 9 is a schematic structural hardware diagram of a device for locating a target region according to an embodiment of this application.

FIG. 9 is a schematic structural hardware diagram of an image processing device according to an embodiment of this application. The image processing device 600 shown in FIG. 9 includes a memory 601, a processor 602, a communications interface 603, and a bus 604. The memory 601, the processor 602, and the communications interface 603 are connected to each other by the bus 604 to implement communications connection between each other.

The memory 601 may be a read-only memory (ROM), a static storage device, or a random access memory (RAM). The memory 601 may store a program. When the program stored in the memory 601 is executed by the processor 602, the processor 602 and the communications interface 603 are configured to perform steps of the method for locating a target region according to an embodiment of this application.

The processor 602 may be a general-purpose central processing unit (CPU), a microprocessor, an application specific integrated circuit (ASIC), a graphics processing unit (GPU), or one or more integrated circuits. The processor is configured to perform relevant programs to implement the functions of units in the device for locating a target region according to an embodiment of this application or perform the method for locating a target region according to an embodiment of this application.

Alternatively, the processor 602 may be an integrated circuit chip capable of processing signals. In an implementation process, the steps of the method for locating a target region according to an embodiment of this application may be performed by an integrated logic circuit in the hardware form or an instruction in the software form in the processor 602.

The processor 602 may be a general-purpose processor, a digital signal processor (DSP), an ASIC, a field programmable gate array (FPGA), or another programmable logic device, a discrete gate, or a transistor logic device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware processor, or performed by a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 601. The processor 602 reads the information in the memory 601, and works together with hardware to perform the functions of the units included in the device for locating a target region according to an embodiment of this application, or perform the method for locating a target region according to an embodiment of this application.

The communications interface 603 may use, but without being limited to, a transmit-and-receive device such as a transceiver to implement communication between the device 600 and another device or a communications network. For example, traffic data of an unknown device may be obtained through the communications interface 603.

The bus 604 may include a path configured to transfer information between components (for example, memory 601, processor 602, and communications interface 603) of the device 600.

It is hereby noted that although the device 600 shown in the drawing includes just a memory, a processor, and a communications interface, a person skilled in the art understands that the device 600 in specific implementations may include other components required for normal operation. In addition, a person skilled in the art understands that the device 600 may further include a hardware component configured to implement another additional function as specifically required. Moreover, a person skilled in the art understands that the device 600 may include just the components necessary to implement an embodiment of this application, but without including all components shown in FIG. 9.

An embodiment of this application further provides a computer-readable storage medium. The storage medium stores program code executable by a device. The program code includes an instruction for performing the steps in the method for locating a target region.

An embodiment of this application further provides a computer program product. The computer program product includes a computer program stored on a computer-readable storage medium. The computer program includes a program instruction. When executed on a computer, the program instruction causes the computer to perform the method for locating a target region.

The computer-readable storage medium may be a transitory computer-readable medium or a non-transitory computer-readable storage medium.

A person skilled in the art is clearly aware that for convenience and brevity of description, a detailed working process of the device described above may be learned by referring to the corresponding process in the foregoing method embodiment, details of which are omitted here.

In the several embodiments provided in this application, it is understandable that the disclosed device and method may be implemented in other manners. For example, the described device embodiment is merely illustrative. For example, the division of the device into several units is merely a type of logic function division, and the device may be divided in other manners in practical implementations. For example, a plurality of units or components may be combined or integrated into another system, or some features may be ignored or skipped. In addition, a mutual coupling or direct coupling or communications connection illustrated or discussed herein may be an indirect coupling or communications connection implemented through some interfaces, devices, or units, and may be in electrical, mechanical or other forms.

The terms used herein are merely used to describe an embodiment but not to limit the claims. Unless otherwise expressly specified in the context, a noun in the singular form preceded by "a", "an", or "the" used in the description of an embodiment or claims is intended to include the plural form of the noun. Similarly, the term "and/or" used herein means any and all possible combinations of one or more relevant items recited. In addition, when used in this application, the terms "include" and "comprise" mean the presence of stated features, entirety, steps, operations, elements, and/or components, but without excluding the presence or addition of one or more other features, entirety, steps, operations, elements, components, and/or any combination thereof.

The aspects, implementation manners, implementations, or features in a described embodiment can be used alone or in any combination. Each aspect of an embodiment described herein may be implemented by software, hardware, or a combination of hardware and software. The described embodiment may be embodied by a computer-readable medium that stores computer-readable code. The computer-readable code includes an instruction executable by at least one computing device. The computer-readable medium may be correlated with any data storage device capable of storing data that is readable by a computer system. Examples of the computer-readable media may include a read-only memory, a random-access memory, a compact disc read-only memory (CD-ROM), a hard disk drive (HDD), a digital video disc (DVD), magnetic tape, an optical data storage device, and the like. The computer-readable medium may be distributed in a computer system connected over a network so that the computer-readable code can be stored and executed in a distributed manner.

The foregoing technical description may be read by reference to the drawings appended hereto. The drawings form a part hereof and have illustrated the implementations in accordance with the described embodiments. Although the embodiments are described in sufficient detail to enable a person skilled in the art to implement the embodiments, the embodiments are non-restrictive so that other embodiments can be used, and changes may be made to the embodiments without departing from the scope of the described embodiments. For example, the order of operations illustrated in a flowchart is non-restrictive, and therefore, the order of two or more operations illustrated in the flowchart and described with reference to the flowchart may be changed according to several embodiments. As another example, in several embodiments, one or more operations illustrated in the flowchart and described with reference to the flowchart are optional or deletable. In addition, some steps or functions may be added to and embodiment disclosed herein, or the order between two or more steps may be permuted. All such variations are considered to be included in the disclosed embodiments and claims.

Moreover, terms are used in the foregoing technical description to enable a thorough understanding of the described embodiments. However, undue detail is not required to implement the described embodiments. Therefore, the foregoing description of embodiments is rendered for purposes of interpretation and description. The embodiments rendered in the foregoing description and the examples disclosed according to such embodiments are provided separately to add a context for ease of understanding of the described embodiments. The specification described above is not intended to be exhaustive or to limit the described embodiments to a precise form of this application. Several modifications, alternatives, and variations may be made based on the foregoing teachings. In some circumstances, well-known process steps have not been described in detail in order not to unnecessarily obscure the described embodiments. Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A method for locating a target region on an image, comprising:

obtaining coordinates of target points in a to-be-detected image based on a feature point recognition model, wherein the to-be-detected image comprises an unstably imaged target region, a target object in the target region comprises a stably imaged first section and an unstably imaged second section, and the target points comprise a feature point on the first section; and locating the target region based on the coordinates of the target points;

wherein before obtaining coordinates of the target points in the to-be-detected image based on the feature point recognition model, the method further comprises:

training the feature point recognition model based on training data, wherein the training data comprises labeled feature points, and the labeled feature points comprise the feature point on the first section; and wherein training the feature point recognition model based on the training data comprises:

obtaining the training data, wherein the training data comprises a training image set and a feature point dataset:

inputting the training data into a to-be-trained neural network model to perform feature extraction and obtain an estimate of coordinates of the feature point:

determining a function value of a first loss function based on the estimate of the coordinates of the feature point and a ground truth corresponding to the estimate of the coordinates of the feature point in the training dataset, wherein the function value of the first loss function is used to indicate a deviation between the estimate of the coordinates of the feature point and the ground truth;

updating a parameter of the to-be-trained neural network model based on the function value of the first loss function; and determining that the function value of the first loss function has converged to a first threshold, and then using a current neural network model as the feature point recognition model.

2. The method according to claim 1, wherein obtaining the training data comprises:

generating a training image based on a depth map that comprises the target region; and labeling feature points for the training image to obtain the training image set.

3. The method according to claim 1, wherein obtaining the training data comprises:

sorting feature points on a training image to obtain the feature point dataset.

4. The method according to claim 1, wherein the feature point dataset comprises the coordinates and a serial number of the feature point.

5. The method according to claim 1, wherein the feature point dataset comprises a descriptor of the feature point and a relative positional relationship between feature points.

6. The method according to claim 1, wherein before obtaining coordinates of target points in the to-be-detected image based on the feature point recognition model, the method further comprises:

obtaining an original image; and converting the original image into an image in a PNG format to obtain the to-be-detected image.

7. The method according to claim 1, wherein the feature point dataset is stored in a JSON format.

8. The method according to claim 1, wherein, after determining that the function value of the first loss function has converged to the first threshold, the method further comprises:

inputting the training image set as a test set into the feature point recognition model to obtain an estimate of the feature point; and calculating an accuracy metric based on the estimate of the feature point and the ground truth of the coordinates of the feature point corresponding to the training image set.

9. The method according to claim 8, wherein the accuracy metric is a Euclidean square root mean value of the estimate of the feature point and the ground truth of the coordinates of the feature point corresponding to the training image set.

10. The method according to claim 1, wherein the to-be-trained neural network model comprises a backbone feature extraction neural network, and the backbone feature extraction neural network is a ResNet18 neural network.

11. The method according to claim 1, wherein the first loss function is a Smooth L1 loss function.

12. The method according to claim 1, wherein the to-be-detected image is an image of an adapter strip and an electrode post that are welded in a battery cell; and the target region comprises a weld region of the electrode post and the adapter strip.

13. The method according to claim 12, wherein the target object is the adapter strip, the adapter strip comprises a tab connecting portion and an electrode post connecting portion, one end of the tab connecting portion is connected to the electrode post connecting portion, the first section is the tab connecting portion, and the target points comprise coordinate points located at two ends of the tab connecting portion.

14. A device, comprising a processor and a memory;

wherein the memory is configured to store a program, and the processor is configured to call the program from the memory and run the program;

wherein the program, when executed, causes the device to perform a method for locating a target region on an image that comprises:

obtaining coordinates of target points in a to-be-detected image based on a feature point recognition model, wherein the to-be-detected image comprises an unstably imaged target region, a target object in the target region comprises a stably imaged first section and an unstably imaged second section, and the target points comprise a feature point on the first section; and locating the target region based on the coordinates of the target points;

wherein before obtaining coordinates of the target points in the to-be-detected image based on the feature point recognition model, the method further comprises:

training the feature point recognition model based on training data, wherein the training data comprises labeled feature points, and the labeled feature points comprise the feature point on the first section; and wherein training the feature point recognition model based on the training data comprises:

obtaining the training data, wherein the training data comprises a training image set and a feature point dataset:

inputting the training data into a to-be-trained neural network model to perform feature extraction and obtain an estimate of coordinates of the feature point:

determining a function value of a first loss function based on the estimate of the coordinates of the feature point and a ground truth corresponding to the estimate of the coordinates of the feature point in the training dataset, wherein the function value of the first loss function is used to indicate a deviation between the estimate of the coordinates of the feature point and the ground truth;

updating a parameter of the to-be-trained neural network model based on the function value of the first loss function; and determining that the function value of the first loss function has converged to a first threshold, and then using a current neural network model as the feature point recognition model.

15. A non-transitory computer-readable storage medium, configured to store a computer program, which when executed on a computer, causes the computer to perform a method for locating a target region on an image that comprises:

obtaining coordinates of target points in a to-be-detected image based on a feature point recognition model, wherein the to-be detected image comprises an unstably imaged target region, a target object in the target region comprises a stably imaged first section and an unstably imaged second section, and the target points comprise a feature point on the first section; and locating the target region based on the coordinates of the target points;

wherein before obtaining coordinates of the target points in the to-be-detected image based on the feature point recognition model, the method further comprises:

training the feature point recognition model based on training data, wherein the training data comprises labeled feature points, and the labeled feature points comprise the feature point on the first section; and wherein training the feature point recognition model based on the training data comprises:

obtaining the training data, wherein the training data comprises a training image set and a feature point dataset:

inputting the training data into a to-be-trained neural network model to perform feature extraction and obtain an estimate of coordinates of the feature point:

determining a function value of a first loss function based on the estimate of the coordinates of the feature point and a ground truth corresponding to the estimate of the coordinates of the feature point in the training dataset, wherein the function value of the first loss function is used to indicate a deviation between the estimate of the coordinates of the feature point and the ground truth:

updating a parameter of the to-be-trained neural network model based on the function value of the first loss function; and determining that the function value of the first loss function has converged to a first threshold, and then using a current neural network model as the feature point recognition model.

* * * * *